(12) United States Patent
Dhawan et al.

(10) Patent No.: US 11,232,461 B2
(45) Date of Patent: *Jan. 25, 2022

(54) SYSTEM AND METHOD FOR CAUSING MESSAGES TO BE DELIVERED TO USERS OF A DISTRIBUTED VOICE APPLICATION EXECUTION SYSTEM

(71) Applicant: XTONE, INC., McLean, VA (US)

(72) Inventors: Vishal Dhawan, Centreville, VA (US); Timothy M Price, Rockville, MD (US); Manoj Sindhwani, Oak Hill, VA (US)

(73) Assignee: Xtone, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,033

(22) Filed: Feb. 24, 2020

(65) Prior Publication Data

US 2020/0234311 A1 Jul. 23, 2020

Related U.S. Application Data

(63) Continuation of application No. 15/784,423, filed on Oct. 16, 2017, now abandoned, which is a
(Continued)

(51) Int. Cl.
*H04M 1/247* (2021.01)
*H04M 1/253* (2006.01)
(Continued)

(52) U.S. Cl.
CPC ......... *G06Q 30/02* (2013.01); *G06Q 30/0269* (2013.01); *H04M 1/2477* (2013.01);
(Continued)

(58) Field of Classification Search
USPC .................................................. 379/265.09
See application file for complete search history.

(56) References Cited

U.S. PATENT DOCUMENTS 5,074,923 A 12/1991 Offers et al.
5,323,444 A 6/1994 Ertz et al.
(Continued)

FOREIGN PATENT DOCUMENTS

WO 96/20448 7/1996

OTHER PUBLICATIONS

Feb. 26, 2010 Office Action issued in U.S. Appl. No. 11/514,116.
(Continued)

*Primary Examiner* — Amal S Zenati
(74) *Attorney, Agent, or Firm* — FisherBroyles, LLP

(57) ABSTRACT

A system that is capable of receiving and interpreting a user's spoken commands is also coupled to a television interface device that controls video programming content displayed the user's television. The user can speak commands to cause certain programs to be played, and to control various functions of the television. The system can track and analyze a user's video viewing habits. In addition, the system is able to determine which of multiple users might be interested in a particular video program, and the system can play marketing messages regarding that video program to those users that might be interested in viewing the video program.

23 Claims, 5 Drawing Sheets

Related U.S. Application Data continuation of application No. 12/717,875, filed on Mar. 4, 2010, now Pat. No. 9,799,039, which is a continuation-in-part of application No. 11/514,116, filed on Sep. 1, 2006, now abandoned.

(60) Provisional application No. 61/157,316, filed on Mar. 4, 2009, provisional application No. 60/712,808, filed on Sep. 1, 2005.

(51) Int. Cl.
*H04M 1/72445* (2021.01)
*G06Q 30/02* (2012.01)

(52) U.S. Cl.
CPC ...... *H04M 1/2535* (2013.01); *H04M 1/72445* (2021.01); *H04M 2250/74* (2013.01)

(56) References Cited

U.S. PATENT DOCUMENTS

| | | | |
|---|---|---|---|
| 5,918,014 A | 6/1999 | Robinson | |
| 6,212,408 B1 | 4/2001 | Son et al. | |
| 6,285,984 B1* | 9/2001 | Speicher | G06Q 30/02 705/14.73 |
| 6,334,103 B1 | 12/2001 | Surace et al. | |
| 6,408,272 B1 | 6/2002 | White et al. | |
| 6,636,831 B1 | 10/2003 | Profit, Jr. et al. | |
| 6,738,743 B2 | 5/2004 | Sharma et al. | |
| 6,757,781 B2 | 6/2004 | Williams et al. | |
| 6,829,334 B1 | 12/2004 | Zirngibl et al. | |
| 6,882,974 B2 | 4/2005 | James et al. | |
| 6,901,431 B1 | 5/2005 | Dodrill et al. | |
| 6,977,992 B2 | 12/2005 | Zirngibl et al. | |
| 6,988,070 B2 | 1/2006 | Kawasaki et al. | |
| 7,016,847 B1 | 3/2006 | Tessel et al. | |
| 7,020,609 B2 | 3/2006 | Thrift et al. | |
| 7,062,709 B2 | 6/2006 | Cheung | |
| 7,376,222 B2 | 5/2008 | Lin | |
| 7,702,084 B2 | 4/2010 | Wolmuth | |
| 7,809,376 B2 | 10/2010 | Letourneau et al. | |
| 7,844,215 B2* | 11/2010 | Vance | H04M 3/4938 455/3.06 |
| 2002/0001370 A1 | 1/2002 | Walker et al. | |
| 2002/0059073 A1 | 5/2002 | Zondervan et al. | |
| 2002/0169604 A1 | 11/2002 | Damiba et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0144005 A1 | 7/2003 | Videtich | |
| 2003/0191816 A1 | 10/2003 | Landress et al. | |
| 2003/0233238 A1 | 12/2003 | Creamer et al. | |
| 2004/0006471 A1 | 1/2004 | Chiu | |
| 2004/0010412 A1 | 1/2004 | Chiu | |
| 2004/0151285 A1 | 3/2004 | Sychta | |
| 2004/0068364 A1 | 4/2004 | Zhao et al. | |
| 2004/0163073 A1 | 8/2004 | Krzyzanowski et al. | |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0293897 A1 | 12/2006 | White et al. | |
| 2007/0078706 A1 | 4/2007 | Datta et al. | |
| 2007/0143113 A1 | 6/2007 | Nanavati et al. | |
| 2007/0283268 A1* | 12/2007 | Berger | G06F 16/78 715/716 |
| 2009/0007171 A1 | 1/2009 | Casey et al. | |
| 2010/0086107 A1* | 4/2010 | Tzruya | H04M 3/2281 379/88.01 |
| 2013/0045778 A1 | 2/2013 | Sundaresan et al. | |

OTHER PUBLICATIONS

Dhawan et al., U.S. Appl. No. 12/717,893, filed Mar. 4, 2010.
Dhawan et al., U.S. Appl. No. 12/717,881, filed Mar. 4, 2010.
Dhawan et al., U.S. Appl. No. 12/717,888, filed Mar. 4, 2010.
Dhawan et al., U.S. Appl. No. 12/717,865, filed Mar. 4, 2010.
Dhawan et al., U.S. Appl. No. 12/717,858, filed Mar. 4, 2010.
Dhawan et al., U.S. Appl. No. 12/717,854, filed Mar. 4, 2010.
Dhawan et al., U.S. Appl. No. 12/717,839, filed Mar. 4, 2010.
Dhawan et al., U.S. Appl. No. 12/717,826, filed Mar. 4, 2010.
Dhawan et al., U.S. Appl. No. 12/717,897, filed Mar. 4, 2010.
Dhawan et al., U.S. Appl. No. 11/514,116, filed Sep. 1, 2006.

* cited by examiner

SYSTEM AND METHOD FOR CAUSING MESSAGES TO BE DELIVERED TO USERS OF A DISTRIBUTED VOICE APPLICATION EXECUTION SYSTEM

This application is a continuation of U.S. application Ser. No. 15/784,423 filed Oct. 16, 2017, which is a continuation of continuation of U.S. application Ser. No. 12/717,875, filed Mar. 4, 2010, now U.S. Pat. No. 9,799,039, which claims priority to the filing date of U.S. Provisional Application No. 61/157,316, filed on Mar. 4, 2009, and which is a continuation-in-part of U.S. application Ser. No. 11/514,116, which was filed on Sep. 1, 2006, which itself claims priority to the filing date of U.S. Provisional Application No. 60/712,808, which was filed on Sep. 1, 2005, the contents of all of which are hereby incorporated by reference.

FIELD OF THE INVENTION

The invention relates to systems and methods that provide video programming recommendations and marketing messages to users based on their prior on video program viewing patterns and user demographic and personal preference information. The invention also relates to systems and methods for allowing users to control video program viewing and recording functions using speech-based commands.

BACKGROUND OF THE INVENTION

Presently, many people receive television and video programming via a cable or satellite provider. As shown in FIG. 1, typically the user's television 10 is connected to a network interface device 20. The network interface device 20 is then coupled to a cable company's cable line that is run into the user's house, or to a satellite antenna that receives a satellite feed.

The network interface device 20 is capable of receiving digital data from a television programming source 400, and converting that digital data into a form that can be displayed on a television 10. The television programming that is played through the user's television 10 could be real-time programs that are being broadcast, or on-demand programming that has been requested by the user.

In some instances, the same network interface device 20 can also be used to couple a user's computer 14 to a data network. Further, the network interface device 20 might also be used to provide the user with telephone service to his telephone 16. In FIG. 1, a single network interface device 20 is shown as providing the user's computer 14 with access to the Internet and also providing telephone service to the user's telephone. In actual implementations, multiple individual devices might be used for each purpose. In other words, a first network interface device might link the user's television to the source of television programming, a second network interface device could be used to link the user's computer to the Internet, and a third interface device could be used to couple the user's telephone to the telephone network 230 via the data network 220. However, each of the network interface devices would utilize the same communications medium, such as a coaxial cable that is run to the user's house.

Digital recorders that are capable of recording television programs have also come into widespread use. Such devices can be coupled to a network interface device 20, or the recording device 12 could be integrated into the same physical device as the network interface device 20. Such digital recorders are capable of receiving and recording television programming. In some instances, the digital recorders 12 can be programmed to record particular programs using the television 10 as a display screen, and using a remote control device to provide user input.

In addition, some such digital recording devices 12 are also capable of accessing the Internet and downloading information about upcoming television programming over the Internet. This information can then be used to help display the upcoming television programming as part of a user interaction to schedule a recordation action. When the recording device 12 is able to access the Internet to download information, that access can be provided through the network interface device 20, or through a separate Internet connection.

Some digital recording devices 12 are also capable of accessing and downloading television programming and movies from the Internet, and then playing those downloaded shows, through the television, at the user's convenience. Here again, if the recording device is capable of accessing the Internet, that access could be provided by the network interface device, or via a separate Internet connection.

There are various existing computer and telephony systems that provide voice services to users. These voice services can be speech recognition and touchtone enabled. Examples of such services include voice mail, voice activated dialing, customer care services, and the provision of access to Internet content via telephone.

Some display screens that primarily operate as televisions are also capable of displaying video images generated by a computer. Thus, it is now possible to view video programming on a television 10 based on video images that are playing on a connected computer 14. The computer 14 might be playing a video from a DVD, from a recording on the computer's hard disk, or from data it is receiving from a data network 220. As noted above, the computer 14 could be directly coupled to the data network 220, or the computer could be linked to the data network 220 via an interface device 20.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

In a typical prior art architecture for a centralized voice services platform, the speech recognition functions are performed at a central computer system. A user telephone is used to place a telephone call to a central voice services platform via a telephone network. The telephone network could be a traditional PSTN, or a VoIP based system. Either way, the user would have to establish the telephone call to the central voice service platform via a telephone carrier.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

With the prior art voice services platforms, it was difficult to develop efficient mechanisms for billing the users. Typically, the telephone carrier employed by the user would bill the user for calls made to the voice services platform. The amount of the charges could be determined in many different ways. For instance, the telephone carrier could simply bill the user a flat rate for each call to the voice services platform. Alternatively, the telephone carrier could bill the user a per-minute charge for being connected to the voice services platform. In still other methods, the voice services platform could calculate user charges and then inform the carrier about how much to bill the user. Regardless of how the charges are calculated, it would still be necessary for the telephony carrier to perform the billing, collect the money, and then pay some amount to the voice service platform.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

Some prior art voice services platforms were used to send audio messages to users via their telephones. The central voice services platform would have a pre-recorded audio message that needed to be played to multiple users. The platform would call each of the users, and once connected to a user, would play the audio message. However, when it was necessary to contact large numbers of users, it could take a considerable amount of time to place all the calls. The number of simultaneous calls that can be placed by the centralized voice services platform is obviously limited by the number telephone ports it has. Further, in some instances, the PSTN was incapable of simultaneously connecting calls on all the available line ports connected to the voice services platform. In other words, the operators found that when they were trying to make a large number of outgoing calls on substantially all of their outgoing lines, the PSTN sometimes could not simultaneously connect all of the calls to the called parties. Further, when a voice services platform is delivering audio messages in this fashion, they tie up all the telephone port capacity, which prevents users from calling in to use the service.

One use of a voice services platform as discussed above relates to interacting with a television broadcast audience. In recent years, television programs have included various contests which allow members of the viewing audience to vote as part of the process of establishing a winner. In some instances, audience members located at home are capable of voting by calling pre-determined telephone numbers. Typically one number would be established for a yes vote and another number would be established for a no vote. If the audience was voting for one of multiple different contestants, each contestant might have a different pre-determined telephone number, and the viewing audience would be capable of voting by calling the telephone number for the contestant that they believed should win.

As mentioned above, the voice services platforms that would receive call-in votes for this sort of a television contest would need to be able to receive large numbers of telephone calls over a relatively short period of time. However, there are some serious limitations on the ability of such a system to receive and tabulate the votes of all audience members wishing to cast a vote. Such systems were limited by the number of telephone lines into the system, and the ability of the PSTN to connect incoming calls to all of those lines. As a result, in most instances, the systems are only able to receive and tabulate votes for a fraction of the total number of audience members wishing to vote.

Over the last few years, more and more individuals have acquired mobile telephones that have the ability to send text messages. The text messages are communicated exclusively in a digital data format, although they traverse the cellular telephone network. It is possible to process a much larger number of text messages than actual telephone call votes for the same period of time. Also, it is generally less expensive to process a text message, as opposed to a telephone call. As a result, the producers of some television programs asking for audience participation have begun to instruct the audience members to vote or provide input via text messages.

An example of such a system is illustrated in FIG. 2. As shown therein, multiple mobile telephones 1020 are connected to the cellular telephone network 1050 and are capable of sending text messages via the cellular telephone network. In some instances, the television program producers invite audience members to send a message to one telephone number 1060 for a yes vote and to another telephone number 1062 for a no vote. Alternatively, the program producers might use a single telephone number and actually examine the content of the text messages to determine how the audience members are voting.

The text messaging approach has the capability to allow more audience members to vote, but there are still problems. To begin with, the cellular telephone network also has hard limits to the number of text messages that can be handled in any given period of time. Due to internal system delays, some messages may not arrive before the program needs to tabulate and display the results of the voting. As a result, some, or possibly many audience members will think that they have cast a vote, even thought the text message with their vote arrives too late to be counted. In addition, depending on the service plan held by the individual audience members, the audience members may be charged for sending the text message.

Another approach to receiving audience participation involves having the audience members send an e-mail to a particular e-mail address, or having the audience members log onto a particular website to cast a vote. These methods also have drawbacks. First, many people do not have access to the Internet. For those that do, they may have their computer located in a room of their house that is separate from the room containing the television. As a result, it may be highly inconvenient for an audience member to go to his computer to cast a vote. Also, there are limits on the number of visitors that a website can receive on a simultaneous basis. If too many audience members try to log onto a website at the same time to cast a vote, it can result in the website crashing, which prevents anyone from voting.

DETAILED DESCRIPTION OF PREFERRED EMBODIMENTS

Figure 1:
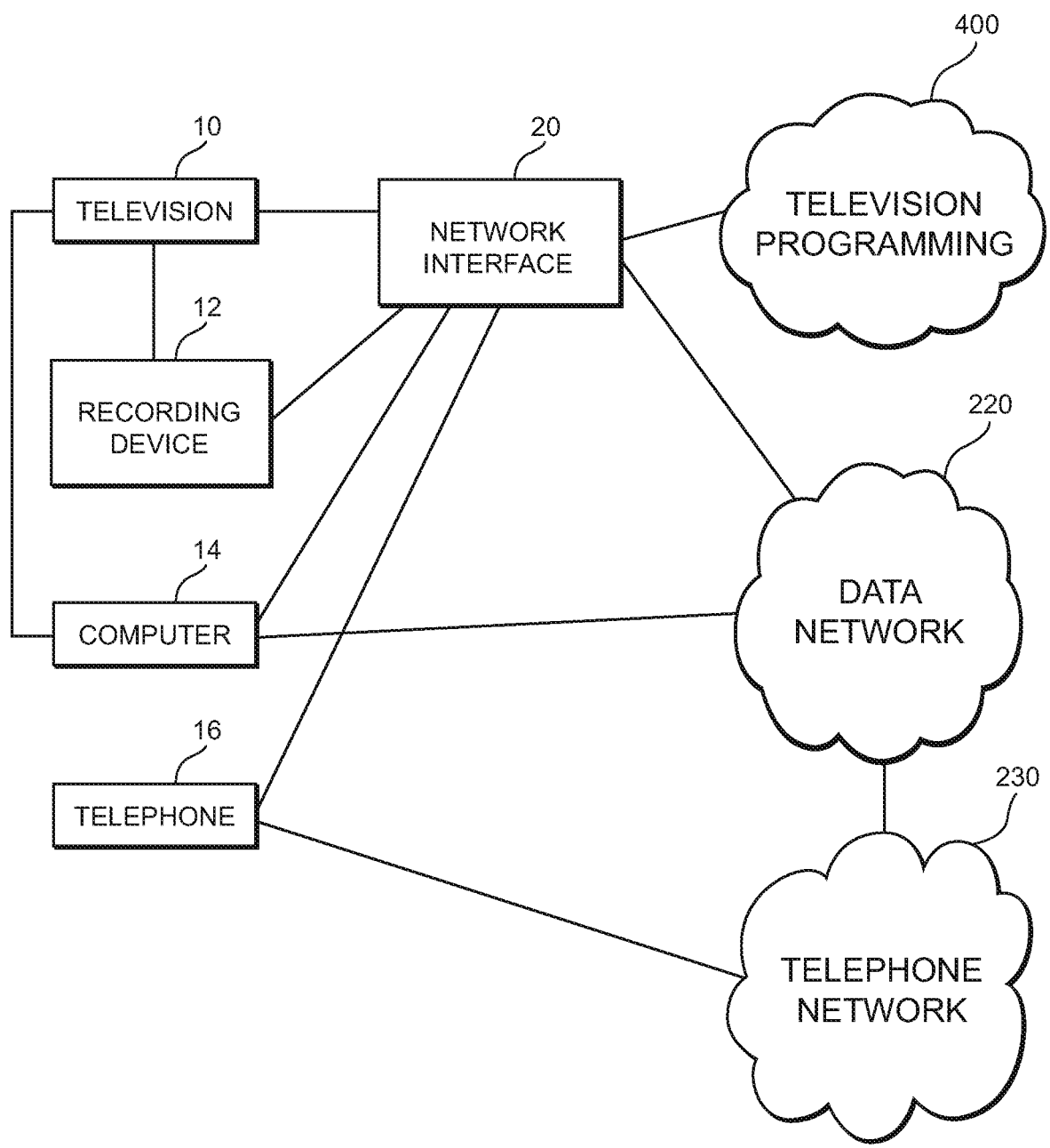
FIG. 1 illustrates various elements that may be present in a user's home to provide the user with television and video programming services, Internet access and telephone service.
Figure 2:
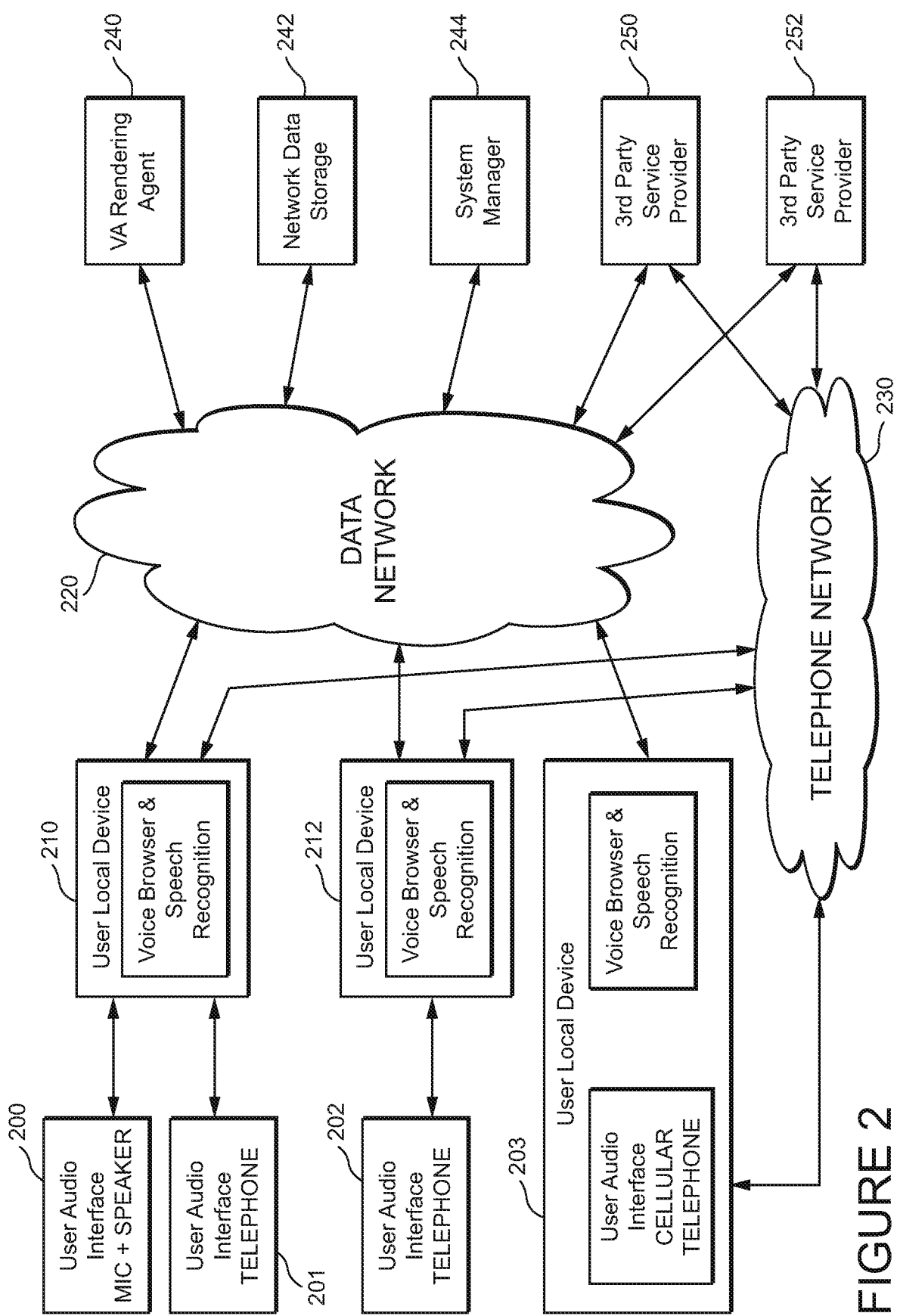
FIG. 2 illustrates elements of a system embodying the invention.

The inventors have developed new systems and methods of delivering voice-based services to users which make use of some aspects of the basic architecture illustrated in FIG. 2. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 2, which depicts a high-level diagram of how a system embodying the invention would be organized.

As shown in FIG. 2, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Systems embodying the invention, as shown in FIG. 2, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVEASA. In the embodiment shown in FIG. 2, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 2, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 2 is intended to illustrate this sort of an embodiment.

Also, in FIG. 2, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 2 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 2, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 2 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Because of the greater sophistication that is possible with a system embodying the invention, if the local device does not understand something, it can often ask another question of the user to clarify the situation. In addition, the local device can offer greatly expanded vocabulary and speech processing by enlisting the assistance of network agents. For all these reasons, a consumer electronic device that is coupled into the DVAES architecture can provide a much more sophisticated voice application than prior art devices which were not connected to a network.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This could be done on the local device, or the voice application could utilize remote assets to accomplish the speech recognition. Some or all of the speech recognition could occur on the remote assets. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet.

The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 2. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

Figure 3:
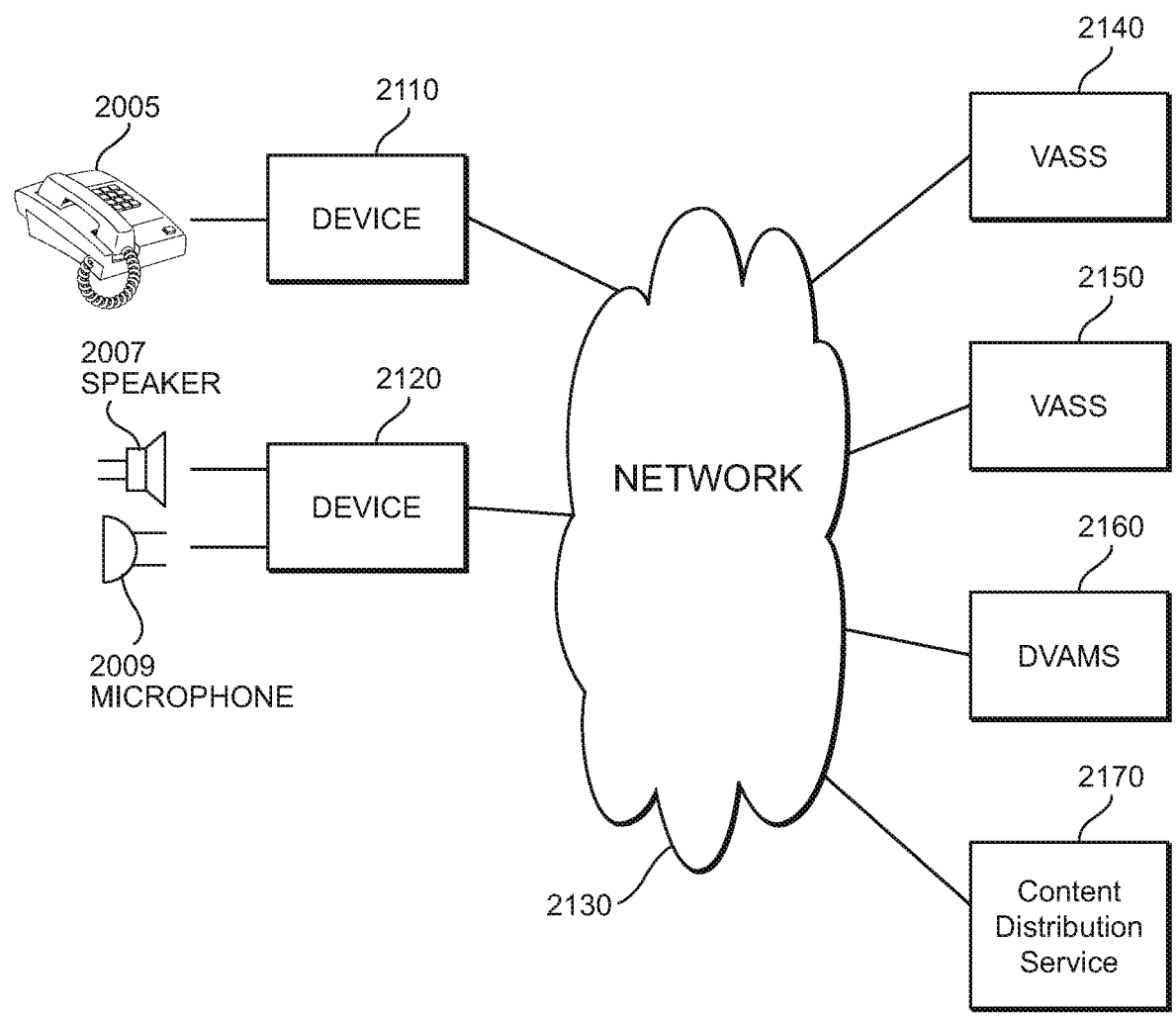
FIG. 3 illustrates elements of another system embodying the invention.

The network 2130 shown in FIG. 3 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

Figure 4:
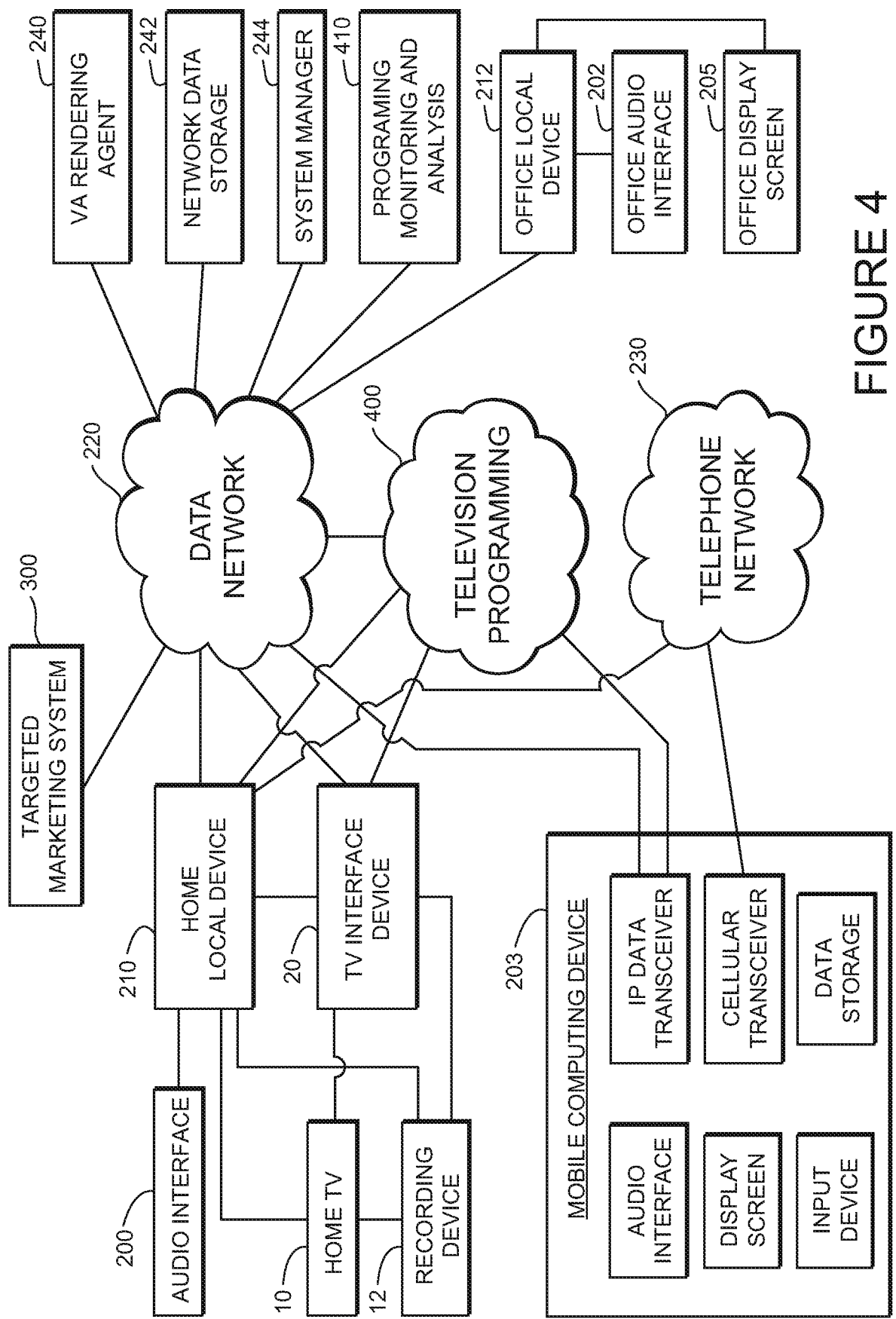
FIG. 4 illustrates elements of another system embodying the invention.

The devices 2110 and 2120 appearing in FIG. 3 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 3, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 3 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

With this background information about the system architecture, we will now turn to a more detailed discussion of the specific services that can be provided to assist users of a system as described above with television and video programming related issues. This discussion will refer to the system illustrated in FIG. 4, which includes elements of the overall DVAES architecture, and elements of a traditional television and video programming delivery system.

As shown in FIG. 4, the user's home local device 210 could be connected to the source of television programming content 400, either directly or via the data network 220. In some instances, the source of television and video programming 400 could be coupled directly to a TV interface device 20. The sources of television and video programming content 400 would typically be a cable or satellite programming provider. In addition, video programming could also be received from an on-demand provider that delivers video programming content through a separate data network 220, such as the Internet. The on-demand provider could be linked to the local device 210 and/or to the TV interface device 20.

With respect to television broadcasts, the home local device 210 would be able to obtain information generally available over the Internet or information available from the television programming source 400 to determine what broadcast programs will be available on what channels at what times. The home local device 210 might also be able to query these sources and one or more sources of on-demand programming to determine what on-demand programs are available for viewing.

The user could then interact with the system via an audio interface to request information about upcoming broadcast programs and available on-demand programming using voice commands. The user could be located at his home, in which case he would use the audio interface 200 coupled to his home local device 210. Alternatively, the user would be able to obtain the same information using an audio interface on his mobile computing device 203, or an audio interface 202 connected to the user's office local device 212 in his office. In each of these instances, the user would be interacting with a voice application performed on the local device to obtain information about video programming.

The user's TV interface device 20, which would be the in-home device coupled to a cable, a satellite antenna, or a source of on-demand programming, is coupled to the user's home TV 10. The TV interface device 20 might also be connected to the data network 220, either directly, or through the local device 210. The TV interface device 20 would access programming content through these various sources, and cause the content to be displayed on the home TV 10. This could involve obtaining the programming content from a satellite or cable service, or from a content provider accessible via the Internet. The TV interface device 20 might also obtain information about available programming content from these sources, or from a separate video programming source 400 or a separate data source available over a data network 220.

The TV interface device 20 is also coupled to the user's home local device 210. This would allow the system to monitor the television and video programs that are watched by the user over an extended period of time. The home local device 210 could perform a voice application that analyzes the user's television and video viewing patterns to determine what broadcast shows and on demand videos are of interest to the user, the categories programming most watched by the user, and the times during the day that the user typically watches video content. Using this information, the system may be able to make recommendations to the user about upcoming broadcast programs or available on demand content that would likely be of interest to the user.

In some instances, the monitoring and analysis of the user's viewing habits could be carried out on the home local device 210 by a VA that has been rendered to the home local device from the VA rendering agent 240. Alternatively, information regarding a user's viewing habits could be sent from the home local device 210 to a remote programming monitoring and analysis unit 410, and the analysis could be carried out by the monitoring and analysis unit 410.

Program recommendations could be delivered to the user in many different ways. In some instances, a user could access the system from any one of his multiple audio interfaces, and the user could simply ask for recommendations of upcoming television programs or on demand video content using spoken commands. As noted above, the request for such information could be made from the user's home audio interface, from the user's office audio interface, or from the user's mobile computing device. The recommendations could be played as audio information, or they might be displayed on a display screen visible to the user.

In these instances, a voice application being performed on one of the user's local devices would be interacting with the user to provide the user with the programming recommendations. The voice application might query a remote programming monitoring and analysis unit 410 for assistance in providing the user with recommendations. The voice application might also access television programming information from the television programming source 400, or from another source accessible via the data network 220.

In other instances, if the user is already interacting with the system for another purpose, at the conclusion of that interaction the system might make a spontaneous recommendation to the user regarding upcoming programs or available content that would likely be of interest to the user. Also, rather than waiting for a user to interact with the system before delivering such a marketing message, the system might actively initiate contact with the user to deliver a recommendation. Because the system would know the time of day, the user's preferences, and have access to a comprehensive guide of the upcoming broadcast programming and available on-demand programming, the system could offer timely recommendations to the user about specific programs that will be played later the same day, or that are currently available.

Further, video program producers or other interested parties could pay the system to deliver recommendations to users. These recommendations would be more in the nature of a marketing message, since the program producers would be paying to have the messages delivered. Such messages could be particularly valuable in the case of special programs that the user might not otherwise be aware will be shown.

The system could also be used to deliver recommendations for specific video content to those users who have a usage pattern that indicates that the users might be interested in an upcoming program. Likewise, a marketing message regarding video content might be sent to users who have a demographic or a set of known preferences that indicate that the user might be interested in the video content. Thus, the system could provide targeted marketing to those users who are most likely to be interested in certain programs.

This sort of targeted marketing could be carried out by the system without divulging any personal information about the users, or their recorded viewing habits, to the entities requesting that the messages be delivered. For instance, an interested party could simply ask that a recommendation for one of their upcoming programs be played to all users who satisfy a certain demographic. The system would decide which users satisfy the stated demographic, and the system would play the recommendation to those users. But the entity paying to have the recommendation played would not know the identity of the users who receive the recommendation. Thus, the system can provide targeted marketing without violating user privacy.

A targeted marketing system 300 could be coupled to the data network 220. The targeted marketing system 300 could be used to create targeted marketing messages which are to be delivered to various users based on their demographics, or personal characteristics, or their known preferences. The targeted marketing system 300 would interact with other elements of the system, such as the user's local devices, via the data network 220.

Figure 5:
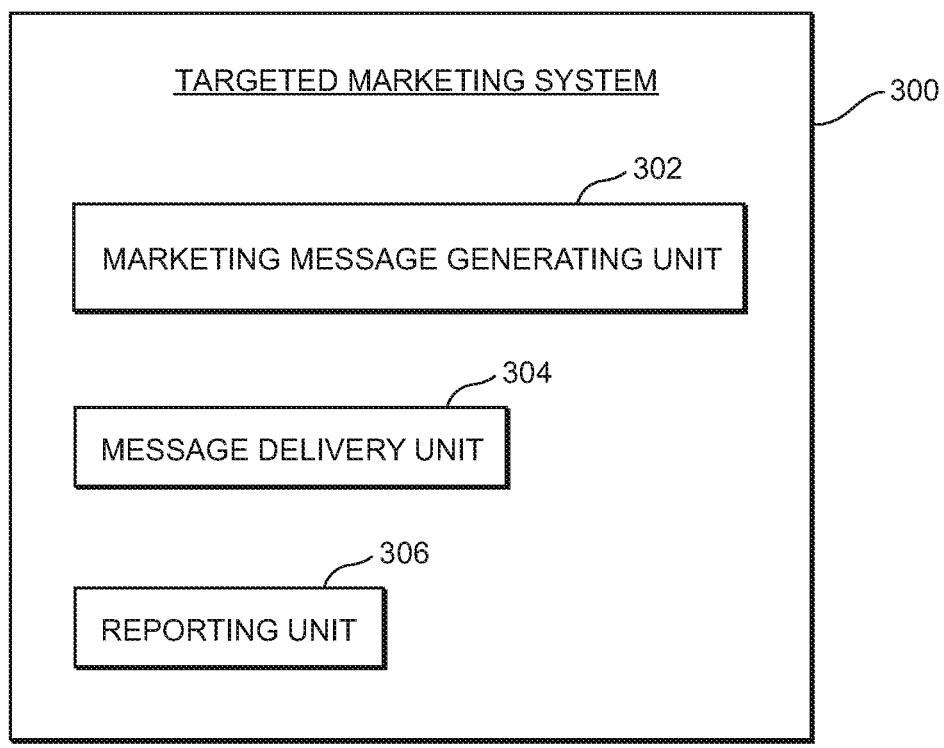
FIG. 5 illustrates elements of a targeted marketing system embodying the invention.

As shown in FIG. 5, the targeted marketing system 300 could include a marketing messaging generating unit 302. A particular marketing message relating to television or video programming could be a simple audio recording which is to be played to various users. However, the same basic recording could be created in multiple different languages. The system itself would know the primary language used by each of its users. Accordingly, when a particular entity requests that the marketing message be played to users, the system would know to play the appropriate language version for each individual user. This allows the system to custom tailor the marketing messages which are delivered to users based upon their known language skills. However, this information is never relayed back to the entity requesting the marketing messages. Thus, customized messages can be played to users without divulging the user's personal information back to the entity sponsoring or paying for the marketing messages.

Far more detailed demographic information may be known about each of the users. That demographic information could be used to determine which marketing messages should be played to which users, or whether it would be appropriate to even play a particular message to a user. The entity requesting that a marketing message be played to users could specify that a particular message is only to be played to users satisfying a specific demographic.

Alternatively, a marketing message relating to a particular video program might be recorded in a significantly different fashion for two different demographic groups. The system would then know to play a first version of the marketing message to users satisfying a first demographic, and to play a second different marketing message for the same program to users satisfying a second different demographic.

A system embodying the invention would be capable of interacting with other systems run by different entities to gather together information that is to be delivered to system users in a targeted or non-targeted fashion. The system then coordinates the timing and delivery of messages, such as marketing messages, to the users at appropriate times, and in appropriate contexts.

For instance, if a user asks for information about a particular show, this might trigger the system to play a marketing message from a third party to the user, where the marketing message relates to a similar show. This might also trigger the system to offer a coupon or discount to the user for a product or service that the system believes may be of interest to the user based on the program information originally requested by the user.

The marketing message which is played to a user could also take the form of a voice application which is able to interact with the user. Because a system embodying the invention is capable of receiving and interpreting spoken input from the users, the marketing message regarding an upcoming program could be highly interactive in nature, to thereby allow a user to ask questions about the program itself, and about when the program will be played and through what channels of distribution.

For instance, a voice application designed to advertise an upcoming broadcast video program could begin to interact with the user by posing the question "a new action series starring John Smith will begin next week. Would you like hear a brief description of the series?" If the user responds with an affirmative answer, the voice application could then play a brief description of the upcoming series. If the system knows the cable or satellite television service provider the user is connected to, the system might also inform the user of the times and channels on which the show will be played. Alternatively, at the end of the program description, the voice application could then pose another question such as "if you state the cable system provider you are using, we can list the broadcast times for the program." If the user then indicates the cable television provider that he utilizes, the system could respond with a description of the channel and broadcast times for the upcoming program.

The foregoing example was only intended to be illustrative. A voice application designed to deliver an advertising message about upcoming programming content could take a variety of different forms and it can interact with a user in a multitude of different ways.

The targeted marketing system 300 also includes a message delivery unit 304. The message delivery unit 304 would be responsible for determining which users should receive a particular marketing message, and for insuring that message is delivered and played to all users who should receive the message. The message delivery unit 304 might interact with databases within the system which contain demographic and other personal information about the users. This would allow the messaging delivery unit to determine who should receive particular marketing messages.

In addition, the message delivery unit 304 could interact with the programming monitoring and analysis unit 410 to access the typical viewing habits of various users. This might allow the message delivery unit 304 to determine which users are likely to be interested in marketing messages for certain upcoming programs.

The targeted marketing system 300 also includes a reporting unit 306 which would generate reports indicating which users received various marketing messages. Alternatively, the reporting unit 306 might generate summary reports which simply indicate the total number of users who have received individual marketing messages.

If the entity requesting that a marketing message be played to users is paying for the messages on a per play basis, the information developed by the recording unit 306 could be used to calculate the ultimate charges which must be paid by the entity requesting that marketing messages be played.

Also, because a user's viewing habits may be monitored by the user's home local device 210 or by a remote programming monitoring and analysis unit 410, the recording unit 306 within the targeted marketing system 300 might also be able to determine whether a particular user actually viewed a particular program after having received a marketing message regarding that program. Thus, the reporting unit might be able to provide reports regarding the effectiveness of the marketing messages which were played to the users. This information, in turn, could be used to help determine which types of marketing messages are most effective in convincing users to the watch the programming discussed in the marketing messages. This information could also be used to determine how to create future marketing messages, and this information might also be used to help price the marketing messages, or the delivery of the marketing messages.

A user could also ask that the system provide recommendations and/or an alert regarding certain programming content. For instance, the user might ask to be reminded whenever certain programs are about to begin. Alternatively, the user might ask that the system check with the user whenever a new episode of a show is about to be broadcast to determine if the user would like to have the show recorded on a recording device. This aspect is discussed in greater detail below.

Also, the user might request that the system inform him whenever a new programming having certain characteristics becomes available. For instance, the user could ask that the system alert him whenever a new program in a certain category becomes available. Alternatively, the user might ask that the system alert him when a particular episode of a series program or a specific newly released movie becomes available for on-demand viewing.

The alerts to users would basically operate through voice applications that are being performed on one of the user's local device. However, the alerts could follow the user from one local device to another. For instance, a user might interact with his home local device to request that he be provided with an alert when an upcoming program is about to start. However, if the user is physically present in his office when the alert should be provided, the system could provide the alert by performing a voice application on the user's office local device.

If the user's home local device 210 is connected to the TV interface device 20 and/or to the user's television 10, the user could also use the audio interface 200 to cause the home TV 10 to tune to a particular channel. As explained above, a system embodying the invention, operating through an audio interface 200 coupled to a local device 210, can provide significantly better speech recognition capabilities than a normal consumer electronic device. As discussed above, a voice application being performed on the local device 210 is able to enlist the aid of remote speech recognition resources to interpret the user's spoken commands and requests. Moreover, the system will already have customized many of the speech recognition characteristics for a particular user by tuning the speech recognition capabilities of the user's local device to account for the user's accent, speech patterns and local environment. For all these reasons, the system could provide a much better speech enabled interface to control the user's television and/or the user's TV interface device than is presently possible with typical consumer electronic devices.

The inventors presently envision that a user's residence might include multiple audio interfaces located in different rooms of the user's residence. An audio interface could be provided in the location where the user has a television 10 that is coupled to the TV interface device 20. And because the TV interface device 20 is coupled to the user's local device 210, a user could issue a spoken command to the system to instruct the system to control the television. This could include any number of different functions, including tuning to a particular channel and/or controlling TV power, volume or other functions. Speech commands could also be issued to cause a particular on-demand program to be played. Likewise, speech commands might also be issued to control functions of an associated or integrated audio system, or a digital video recorder, or some other components that are coupled to the user's local device.

In these instances, the user would be interacting with a voice application being performed on the local device 210, and the user's speech commands would be interpreted and implemented. Because of the interactive nature of voice application, and the excellent speech recognition that can be accomplished, complex operations could be carried out via the speech commands. For instance, the user could issue a speech command to display a list of available programming content, and the user could then issue a speech command to select one of the displayed programs. Of course, the interactions with the system might not all be speech based. For instance, the user might also make use of a controller or a pointing device that communicates with one or more of the television 10, the TV interface device 20 and the local device 210.

If a user has multiple televisions located in different rooms of the house, and multiple audio interfaces, there would not likely be any confusion. The system would know that a television located in a particular room should be controlled based on voice commands being received by the audio interface located in the same room as the television.

In a similar manner, the user could interact with the system to program a recording device 12 coupled to the TV interface device 20 and/or to the television 10. Speech commands could be used to cause the recording device 12 to record a particular program. And because the system would have access to program broadcast information, the user would not need to know the exact channel and broadcast time information for particular programs. The user might be able to simply request that the next broadcast of a particular program be recorded. Or that all broadcasts of a particular program be recorded for a period of weeks or months.

Because a user can access the system via the local devices in multiple different locations, the user could issue these program recording instructions from any audio interface coupled to the system. Thus, the user could interact with a local device at his office to cause a particular program to be recorded on a recording device located in his home, or vice versa.

Also, many mobile computing devices now also have the ability to store television programs, movies and other video presentations on internal storage devices, and they can then play such programming on their display screens whenever the user desires to watch the programs. If a user's mobile computing device 203 includes such capabilities, and it is also configured to act as a local device connected to the system, the user could also instruct that the television programs be recorded on the mobile computing device's data storage for later viewing. Alternatively, the user could instruct that particular programs always be recorded on his mobile computing device's data storage as soon as they become available. In still other embodiments, the user might be able to request that a live television broadcast be played on his mobile computing device.

Moreover, because the user's mobile computing device 203 is coupled to the data network, the user's home recording device 12 is coupled to the data network through the user's home local device 210, and the home recording device 12 is under the control of the user's home local device 210, it may be possible for the user to have programming stored on the user's mobile computing device played on the user's home television 10. Conversely, it might be possible for the user to have programming stored on the user's home recording device 12 played on the user's mobile computing device. Or, programming stored in either location could be played on a display screen 205 and audio interface 202 located in the user's office. Here again, spoken commands from the user, input through any audio interface connected to the system, could cause all of these actions to happen.

In the examples mentioned above, programming content was stored on one of the devices typically in the user's home, office or on his mobile computing device. In other instances, voice applications could cause programming content to be stored for the user on remote network storage devices. And the user could then request that the remotely stored content be played using any of the audio/video devices that the user is capable of using. Likewise, the user might request that content stored on any of his devices, or on a remote network storage device be played on a device owned and operated by another user of the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of delivering messages to users of a distributed voice application execution system, comprising:
   creating or selecting a voice application that will display or play a specific message to a user in an interactive fashion that involves receiving information from the user and acting on that received information, wherein the voice application comprises a set of instructions about how to interact with a user and wherein the voice application is configured to be performed for a user by a voice applications agent; and
   causing the created or selected voice application to be performed, at least in part, on multiple user local devices by voice applications agents that are running, at least in part, on the user local devices such that the specific message is displayed or played to the users in an interactive fashion via the local devices, wherein performing the voice application on a local device comprises a voice applications agent located, at least in part, on the local device following the set of instructions that comprise the voice application in order to interact with the user.

2. The method of claim 1, wherein the created or selected voice application is a generic voice application, and wherein the generic voice application is customized in some way based upon at least one characteristic of a user of the local device before or as it is performed, at least in part, on each user local device.

3. The method of claim 1, wherein the created or selected voice application is a generic voice application, and wherein the generic voice application is customized in some way based upon at least one characteristic of the local device before or as it is performed, at least in part, on each user local device.

4. The method of claim 1, wherein the created or selected voice application is a generic voice application, and wherein the generic voice application is customized in some way based upon at least one characteristic of a data network connection that the local device maintains with a data network before or as it is performed, at least in part, on each user local device.

5. The method of claim 1, further comprising selecting specific individual users to whom the created or selected voice application are to be performed by:
   receiving target user identification criteria, and
   selecting specific individual users that have characteristics that match the target user identification criteria, and
   wherein the causing step comprises causing the created or selected voice application to be performed, at least in part, on user local devices of the selected specific individuals.

6. The method of claim 5, further comprising causing at least a portion of the created or selected voice application to be stored on the user local devices of the selected specific individuals, and wherein the causing step comprises causing the created or selected voice application to be performed, at least in part, on the user local devices of the selected specific individuals by voice applications agents that are running, at least in part, on the user local devices of the selected specific individuals.

7. The method of claim 6, wherein the created or selected voice application is a generic voice application, wherein the method further comprises creating a customized version of the generic voice application for each of the selected specific individuals, and wherein the step of causing at least a portion of the created or selected voice application to be stored on the user local devices of the selected specific individuals comprises, for each of the selected specific individuals, causing at least a portion of that individual's customized voice application to be stored on the individual's local device.

8. The method of claim 1, further comprising causing at least a portion of the created or selected voice application to be stored on multiple user local devices, and wherein the causing step comprises causing the created or selected voice application to be performed, at least in part, on those multiple user local devices by voice applications agents that are running, at least in part, on those multiple user local devices.

9. The method of claim 1, further comprising:
   causing the activity of a user to whom the message was displayed or played to be monitored after performance of the voice application that delivered the message has ended; and
   determining, based on the monitored activity, if the message may have influenced the user's activity.

10. The method of claim 9, wherein the user's activity is monitored by a separate monitoring voice application that is performed, at least in part, on the user's local device.

11. The method of claim 1, wherein in at least some instances, the performance of the created or selected voice application comprises the created or selected voice application obtaining information from a user and reporting the obtained information to a central location.

12. A non-transitory computer readable medium having instructions stored thereon, which when executed by one or more processors of a local device and/or one or more processors of at least one computer server in communication with the local device, cause the local device and/or the at least one computer server to perform a method of delivering a message to users of a distributed voice application execution system, the method comprising:
   creating or selecting a voice application that will display or play a specific message to a user in an interactive fashion that involves receiving information from the user and acting on that received information, wherein the voice application comprises a set of instructions about how to interact with a user and wherein the voice application is configured to be performed for a user by a voice applications agent; and causing the created or selected voice application to be performed, at least in part, on the multiple user local devices by voice applications agents that are running, at least in part, on the user local devices such that the specific message is displayed or played to the users in an interactive fashion via the local devices, wherein performing the voice application on a local device comprises a voice applications agent located, at least in part, on the local device following the set of instructions that comprise the voice application in order to interact with the user.

13. A system for delivering a message to users of a distributed voice application execution system, comprising:

one or more computers programmed to perform operations comprising:

creating or selecting a voice application that will display or play a specific message to a user in an interactive fashion that involves receiving information from the user and acting on that received information, wherein the voice application comprises a set of instructions about how to interact with a user and wherein the voice application is configured to be performed for a user by a voice applications agent; and causing the created or selected voice application to be performed, at least in part, on the multiple user local devices by voice applications agents that are running, at least in part, on the user local devices such that the specific message is displayed or played to the users in an interactive fashion via the local devices, wherein performing the voice application on a local device comprises a voice applications agent located, at least in part, on the local device following the set of instructions that comprise the voice application in order to interact with the user.

14. The system of claim 13, wherein the created or selected voice application is a generic voice application, and wherein the generic voice application is customized in some way based upon at least one characteristic of a user of the local device before or as it is performed, at least in part, on each user local device.

15. The system of claim 13, wherein the created or selected voice application is a generic voice application, and wherein the generic voice application is customized in some way based upon at least one characteristic of the local device before or as it is performed, at least in part, on each user local device.

16. The system of claim 13, wherein the created or selected voice application is a generic voice application, and wherein the generic voice application is customized in some way based upon at least one characteristic of a data network connection that the local device maintains with a data network before or as it is performed, at least in part, on each user local device.

17. The system of claim 13, wherein the operations further comprise selecting specific individual users to whom the created or selected voice application are to be performed by:

receiving target user identification criteria, and selecting specific individual users that have characteristics that match the target user identification criteria, and wherein the causing step comprises causing the created or selected voice application to be performed, at least in part, on user local devices of the selected specific individuals.

18. The system of claim 17, wherein the operations further comprise causing at least a portion of the created or selected voice application to be stored on the user local devices of the selected specific individuals, and wherein the step of causing the created or selected voice application to be performed, at least in part, on the multiple user local devices comprises causing the created or selected voice application to be performed, at least in part, on the user local devices of the selected specific individuals by voice applications agents that are running, at least in part on the user local devices of the selected specific individuals.

19. The system of claim 18, wherein the created or selected voice application is a generic voice application, wherein the operations further comprise creating a customized version of the generic voice application for each of the selected specific individuals, and wherein the step of causing at least a portion of the created or selected voice application to be stored on the user local devices of the selected specific individuals comprises, for each of the selected specific individuals, causing at least a portion of that individual's customized voice application to be stored on the individual's local device.

20. The system of claim 13, wherein the operations further comprise causing at least a portion of the created or selected voice application to be stored on multiple user local devices, and wherein the causing step comprises causing the created or selected voice application to be performed, at least in part, on those multiple user local devices by voice applications agents that are running, at least in part, on those multiple user local devices.

21. The system of claim 13, wherein the operations further comprises:

causing the activity of a user to whom the message was displayed or played to be monitored after performance of the voice application that delivered the message has ended; and determining, based on the monitored activity, if the message may have influenced the user's activity.

22. The system of claim 21, wherein the user's activity is monitored by a separate monitoring voice application that is performed, at least in part, on the user's local device.

23. The system of claim 13, wherein in at least some instances, the performance of the created or selected voice application comprises the created or selected voice application obtaining information from a user and reporting the obtained information to a central location.

* * * * *